United States Patent
Kim

(10) Patent No.: US 11,913,603 B2
(45) Date of Patent: Feb. 27, 2024

(54) PRESSURE VESSEL

(71) Applicants: Hyundai Motor Company, Seoul (KR); Kia Corporation, Seoul (KR)

(72) Inventor: Cheol Hwan Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 59 days.

(21) Appl. No.: 17/678,593

(22) Filed: Feb. 23, 2022

(65) Prior Publication Data

US 2022/0412509 A1 Dec. 29, 2022

(30) Foreign Application Priority Data

Jun. 29, 2021 (KR) .......... 10-2021-0084943

(51) Int. Cl.
*F17C 1/06* (2006.01)
*F17C 13/00* (2006.01)

(52) U.S. Cl.
CPC .............. *F17C 1/06* (2013.01); *F17C 13/002* (2013.01); *F17C 2201/0109* (2013.01); *F17C 2201/019* (2013.01); *F17C 2201/056* (2013.01); *F17C 2203/0617* (2013.01); *F17C 2203/0639* (2013.01); *F17C 2203/0665* (2013.01); *F17C 2203/0673* (2013.01); *F17C 2205/0107* (2013.01); *F17C 2205/0126* (2013.01);
(Continued)

(58) Field of Classification Search
CPC ................ F17C 1/06; F17C 2201/0109; F17C 2203/0617; F17C 2203/0673; F17C 2205/0107; F17C 2205/0126; F17C 2205/0397; F17C 2223/036; F17C 13/002; F17C 13/00; F17C 1/00; F17C 13/08; F17C 2260/018; F17C 2205/0302; F17C 2205/0352; F17C 2205/0361; F17C 2205/0364
USPC ............................... 220/581, 560.05, 560.06
See application file for complete search history.

(56) References Cited

U.S. PATENT DOCUMENTS

2010/0258572 A1* 10/2010 Luongo .................... F17C 1/14
220/581
2014/0217107 A1* 8/2014 Sloan ......................... B60P 7/12
29/428
(Continued)

FOREIGN PATENT DOCUMENTS

DE 102005006998 A1 8/2006
DE 102005006998 B4 * 2/2007 .............. F16J 12/00
(Continued)

OTHER PUBLICATIONS

DE-102005006998 English Machine Translation (Year: 2007).*
WO-03085314 English Machine Translation (Year: 2003).*

*Primary Examiner* — John K Fristoe, Jr.
*Assistant Examiner* — Laura E. Parker
(74) *Attorney, Agent, or Firm* — Fox Rothschild LLP

(57) ABSTRACT

A pressure vessel includes: a barrel part disposed in a predefined square area and having a diameter corresponding to a length of one side of the square area; a first nozzle member disposed at one end of the barrel part; a second nozzle member disposed at an opposite end of the barrel part; and clamp rings disposed in the square area, positioned outside the barrel part, and configured to lock the first and second nozzle members to the barrel part, thereby improving spatial utilization and a degree of design freedom.

18 Claims, 19 Drawing Sheets

(52) U.S. Cl.
CPC .......................... *F17C 2205/0397* (2013.01); *F17C 2221/014* (2013.01); *F17C 2223/0123* (2013.01); *F17C 2223/036* (2013.01); *F17C 2260/013* (2013.01); *F17C 2270/0554* (2013.01)

(56) References Cited

U.S. PATENT DOCUMENTS

| | | | | |
|---|---|---|---|---|
| 2017/0299122 | A1* | 10/2017 | Croteau | F17C 1/00 |
| 2019/0047409 | A1* | 2/2019 | Kataoka | F17C 1/14 |
| 2019/0301676 | A1* | 10/2019 | Sawai | F17C 1/005 |
| 2021/0260994 | A1* | 8/2021 | Gambone | B60K 15/067 |

FOREIGN PATENT DOCUMENTS

| | | | | |
|---|---|---|---|---|
| WO | WO-03085314 | A2 * | 10/2003 | F17C 1/02 |
| WO | WO-2021177953 | A1 * | 9/2021 | F17C 1/06 |

\* cited by examiner

PRESSURE VESSEL

CROSS-REFERENCE TO RELATED APPLICATION

This application claims under 35 U.S.C. § 119(a) the benefit of Korean Patent Application No. 10-2021-0084943 filed in the Korean Intellectual Property Office on Jun. 29, 2021, the entire contents of which are incorporated herein by reference.

BACKGROUND

(a) Technical Field

The present disclosure relates to a pressure vessel, more particularly, to a pressure vessel capable of improving spatial utilization and a degree of design freedom.

(b) Description of the Related Art

A hydrogen vehicle is configured to produce electricity by means of a chemical reaction between hydrogen and oxygen and to travel by driving a motor. The hydrogen vehicle includes a hydrogen tank ($H_2$ tank) configured to store hydrogen ($H_2$), a fuel cell stack configured to produce electricity by means of an oxidation-reduction reaction between hydrogen and oxygen ($O_2$), various types of devices configured to discharge produced water, a battery configured to store the electricity produced by the fuel cell stack, a controller configured to convert and control the produced electricity, and a motor configured to generate driving power.

A TYPE 4 pressure vessel may be used as the hydrogen tank of the hydrogen vehicle. The TYPE 4 pressure vessel includes a liner (e.g., nonmetallic material) including a cylindrical part and dome parts, and a carbon fiber layer made by winding a carbon fiber composite material around an outer surface of the liner.

Meanwhile, recently, various attempts have been made to minimize a space occupied by the pressure vessel to improve spatial utilization and a degree of design freedom of the hydrogen vehicle.

In particular, recently, various attempts have been made to mount a plurality of pressure vessels each having a small diameter, instead of a single large pressure vessel (hydrogen tank), in a limited battery space to use a platform in common for a hydrogen vehicle and an electric vehicle.

However, in the related art, because the pressure vessel has a cylindrical shape having a circular cross-section, a dead zone is inevitably defined between the adjacent pressure vessels. To ensure a sufficient storage space and a sufficient slenderness ratio of the pressure vessel, a diameter of the pressure vessel is difficult to decrease to a certain extent or more, and a space for installing the pressure vessel needs to be ensured to a certain degree or more. For this reason, there is a problem in that spatial utilization and a degree of design freedom deteriorate.

Further, the carbon fiber composite material is lightweight and excellent in strength and elasticity but is very expensive (for example, about 20 or more times more expensive than typical carbon steel having the same weight). Therefore, it is necessary to minimize the amount of use of the carbon fiber composite material in order to reduce manufacturing costs for the pressure vessel.

However, if the amount of use of the carbon fiber composite material, which is used to form the carbon fiber layer of the pressure vessel, is decreased (for example, if a thickness of the carbon fiber layer is decreased) by a predetermined amount or more, there is a problem in that it is difficult to ensure sufficient structural rigidity of the pressure vessel (for example, structural rigidity against stress applied in a circumferential direction and a longitudinal direction to the pressure vessel), and stability and reliability deteriorate.

Moreover, unlike stress (hoop stress) applied to the cylindrical part of the pressure vessel, stress applied to the dome part of the pressure vessel has irregularity (the stress applied to the dome part is not uniform as a whole). Therefore, to sufficiently ensure the structural rigidity of the dome part of the pressure vessel, the carbon fiber composite material with a sufficient thickness needs to be wound around the dome part of the pressure vessel, which causes an inevitable increase in amount of use of the carbon fiber composite material.

Therefore, recently, various studies have been conducted to improve the spatial utilization and the degree of design freedom and minimize the amount of use of the carbon fiber composite material by further reducing the size of the pressure vessel, but the study results are still insufficient. Accordingly, there is a need to develop a technology to improve the spatial utilization and the degree of design freedom and minimize the amount of use of the carbon fiber composite material.

SUMMARY

The present disclosure provides a pressure vessel capable of improving spatial utilization and a degree of design freedom.

In particular, the present disclosure may ensure a sufficient storage space of a pressure vessel and contribute to the miniaturization of the pressure vessel.

The present disclosure also may ensure structural rigidity of a pressure vessel and minimize the amount of use of a carbon fiber composite material.

The present disclosure may improve durability, stability, and efficiency of a pressure vessel, reduce a weight of the pressure vessel, and reduce manufacturing costs.

The present disclosure may simplify a manufacturing process and improve manufacturing efficiency of a pressure vessel.

The objects to be achieved by the embodiments are not limited to the above-mentioned objects, but also include objects or effects that may be understood from the solutions or embodiments described below.

An exemplary embodiment of the present disclosure provides a pressure vessel including: a barrel part disposed in a predefined square area and having a diameter corresponding to a length of one side of the square area; a first nozzle member disposed at one end of the barrel part; a second nozzle member disposed at an opposite end of the barrel part; and clamp rings disposed in the square area, positioned outside the barrel part, and configured to lock the first and second nozzle members to the barrel part.

This is to further reduce the size of the pressure vessel while ensuring a sufficient storage space of the pressure vessel.

That is, in the related art, because the pressure vessel has a cylindrical shape having a circular cross-section, a dead zone is inevitably defined between the adjacent pressure vessels. To ensure a sufficient storage space and a sufficient slenderness ratio of the pressure vessel, a diameter of the pressure vessel is difficult to decrease to a certain extent or more, and a space for installing the pressure vessel needs to be ensured to a certain degree or more. For this reason, there is a problem in that spatial utilization and a degree of design freedom deteriorate.

In particular, because the pressure vessel in the related art has dome parts disposed at two opposite ends of a cylindrical part, a decrease in diameter of the cylindrical part inevitably decreases a size of the dome part. For this reason, there is a problem in that it is difficult to ensure a sufficient mounting space provided in the dome part to mount a nozzle member (the nozzle member for connecting a valve and a pipe). Therefore, there is a problem in that it is difficult to reduce the diameter of the cylindrical part to a certain degree or more.

However, according to the embodiment of the present disclosure, the first and second nozzle members are provided at two opposite ends of the barrel part, and the clamp rings lock the first and second nozzle members to the barrel part. Therefore, it is possible to further reduce the diameter of the barrel part while ensuring the sufficient space for mounting the nozzle members (the first nozzle member and the second nozzle member).

In addition, according to the embodiment of the present disclosure, the storage space (the space cooperatively defined by the barrel part, the first nozzle member, and the second nozzle member) for storing a fluid (e.g., hydrogen) has a cylindrical structure from which the dome parts are excluded (a cylindrical structure having two opposite ends from which the dome parts are removed). Therefore, the stress (hoop stress), which is applied in the circumferential direction (the circumferential direction of the barrel part) among types of stress applied by the fluid, may be applied to the barrel part, and the stress, which is applied in the longitudinal direction (the axis direction of the barrel part) among types of stress applied by the fluid, may be applied to the clamp ring instead of the barrel part. Therefore, it is possible to inhibit the stress from being concentrated on a particular site in the storage space (inhibit irregular stress from being concentrated on the dome part of the pressure vessel in the related art). Accordingly, it is possible to obtain an advantageous effect of improving structural rigidity, safety, and reliability.

Moreover, according to the embodiment of the present disclosure, the dome part having a hemispheric shape may be excluded, unlike the pressure vessel in the related art. Therefore, it is possible to obtain an advantageous effect of simplifying the process of winding the carbon fiber composite material, and inhibiting the amount of use of the carbon fiber composite material from increasing to ensure the structural rigidity of the dome part.

Among other things, according to the embodiment of the present disclosure, the clamp rings are disposed in the predefined square area (the square box space). Therefore, it is possible to obtain an advantageous effect of simplifying the entire structure of the pressure vessel, reducing the size of the pressure vessel, and improving the degree of design freedom and the spatial utilization.

That is, according to the embodiment of the present disclosure, the clamp ring is disposed in a dead zone which is necessarily defined between the predefined square area and the barrel part having a circular cross-section. Therefore, the clamp ring may be mounted without ensuring an additional space for mounting the clamp ring, which makes it possible to further reduce the size of the pressure vessel.

The clamp ring may have various structures capable of locking the first and second nozzle members to the barrel part.

For example, the clamp ring may include: a first side clamp part supported on the first nozzle member; a second side clamp part supported on the second nozzle member; and a connection clamp part configured to continuously connect the first and second side clamp parts.

According to the exemplary embodiment of the present disclosure, the pressure vessel may include: first seating portions protruding from lateral surfaces of the first nozzle member and configured to allow the first side clamp parts to be seated thereon; and second seating portions protruding from lateral surfaces of the second nozzle member and configured to allow the second side clamp parts to be seated thereon.

In particular, the first and second seating portions may each have a semicircular shape, the first side clamp part may be in close contact with the first seating portion, and the second side clamp part may be in close contact with the second seating portion.

The clamp ring may be made of various materials in accordance with required conditions and design specifications.

According to the exemplary embodiment of the present disclosure, the clamp ring may be made of at least one of reinforcing fiber, thermosetting resin, or thermoplastic resin.

For example, the clamp ring may be assembled to partially surround the first and second nozzle members in a state in which the first and second nozzle members are coupled to two opposite ends of the barrel part.

According to another embodiment of the present disclosure, the clamp ring may be provided by winding reinforcing fiber to partially surround the first and second nozzle members in a state in which the first and second nozzle members are coupled to two opposite ends of the barrel part.

According to another exemplary embodiment of the present disclosure, the diameter of the barrel part may be determined as a value between a maximum diameter when the barrel part is maximally expanded immediately before the barrel part bursts and a minimum diameter when the barrel part is in a non-expanded state.

According to another exemplary embodiment of the present disclosure, the clamp ring may have a circular cross-section or a non-circular cross-section.

According to the exemplary embodiment of the present disclosure, the pressure vessel may include: first side plates coupled to the first seating portions and configured to cover lateral sides of the first side clamp parts; and second side plates coupled to the second seating portions and configured to cover lateral sides of the second side clamp parts.

Since the first side plates and the second side plates are provided as described above, it is possible to obtain an advantageous effect of inhibiting the separation of the clamp rings and stably maintaining the state in which the clamp rings are seated on the first and second seating portions.

According to the exemplary embodiment of the present disclosure, the pressure vessel may include a sealing part configured to seal a gap between the barrel part and at least one of the first or second nozzle members.

For example, the sealing part may include: a first sealing member configured to seal the gap; and a second sealing member disposed adjacent to the first sealing member and configured to seal the gap.

According to the embodiment of the present disclosure as described above, the gap between the barrel part and the first nozzle member (or the second nozzle member) is sealed by the dual sealing structure implemented by the first and second sealing members. Therefore, it is possible to obtain an advantageous effect of improving safety and reliability and effectively inhibiting a fluid (e.g., hydrogen) from leaking through the gap between the barrel part and the first nozzle member (or the second nozzle member).

According to the exemplary embodiment of the present disclosure, the plurality of pressure vessels may be arranged in a single layer or multiple layers.

According to the exemplary embodiment of the present disclosure, the square area may be provided in plural, the plurality of square areas may be disposed adjacent to one another to define a matrix, and the barrel parts may be respectively provided in the square areas.

For example, the plurality of square areas, which respectively accommodates the pressure vessels, may be arranged to define a one-dimensional matrix or a two-dimensional matrix in accordance with required conditions and design specifications.

According to the exemplary embodiment of the present disclosure, the pressure vessel may include: coupling holes respectively provided in the adjacent first nozzle members; and a coupling member having one end coupled to any one of the adjacent first nozzle members and an opposite end coupled to other of the adjacent first nozzle members.

According to the exemplary embodiment of the present disclosure, the adjacent second nozzle members may be connected to each other by a coupling hole and a coupling member.

According to the exemplary embodiment of the present disclosure, the pressure vessel may include: a guide protrusion provided on any one of the adjacent second nozzle members; and a guide groove provided in other of the adjacent second nozzle members and configured to accommodate the guide protrusion so that the guide protrusion is slidable in a longitudinal direction of the barrel part.

The adjacent second nozzle members respectively have the guide groove and the guide protrusion as described above. Therefore, when any one of the adjacent barrel parts is expanded (expanded in the longitudinal direction), the relative movement between the second nozzle members in the longitudinal direction of the barrel part may be allowed, whereas relative movement between the second nozzle members in another direction (e.g., a direction intersecting the longitudinal direction of the barrel part) may be inhibited.

According to the exemplary embodiment of the present disclosure, the pressure vessel may include a connection member configured to integrally connect the adjacent first nozzle members.

Since the plurality of first nozzle members are connected to one another by the connection member as described above, it is possible to obtain an advantageous effect of more stably maintaining the disposition and arrangement states of the plurality of pressure vessels and improving safety and reliability.

According to the exemplary embodiment of the present disclosure, the plurality of second nozzle members may be connected to one another by the connection member.

According to the exemplary embodiment of the present disclosure, the pressure vessel may include: a spacer interposed between the adjacent first nozzle members and between the adjacent second nozzle members; and an intermediate clamp ring disposed between the adjacent barrel parts and configured to partially surround the adjacent first nozzle members, the spacer, and the adjacent second nozzle members.

Since the spacer is provided between the adjacent pressure vessels (e.g., between the adjacent first nozzle members) as described above, a predetermined space may be ensured between the adjacent pressure vessels, which makes it possible to allow the adjacent barrel parts to be expanded in a diameter direction.

In addition, in the embodiment of the present disclosure, the clamp rings are not respectively provided on the different pressure vessels, but the single intermediate clamp ring may be used in common as the clamp rings for the different pressure vessels. Therefore, it is possible to obtain an advantageous effect of simplifying the structure.

According to the exemplary embodiment of the present disclosure, the barrel part may include: a liner having a storage space therein; and a reinforcing layer configured to surround an outer peripheral surface of the liner, and the reinforcing layer may be made of at least one of reinforcing fiber, thermosetting resin, or thermoplastic resin.

According to the exemplary embodiment of the present disclosure, at least any one of the first and second nozzle members may include: a nozzle body coupled to one end of the barrel part; and a nozzle cover configured to be movable in a longitudinal direction of the barrel part relative to the nozzle body, and the clamp rings may be supported on the nozzle cover.

Since the nozzle cover rectilinearly moves in the longitudinal direction of the barrel part relative to the nozzle body as described above, the gap between the nozzle body and the nozzle cover (the gap in the longitudinal direction of the barrel part) may be selectively adjusted. Therefore, it is possible to obtain an advantageous effect of easily assembling the clamp ring and securely supporting the mounted state of the clamp ring.

According to the exemplary embodiment of the present disclosure, the pressure vessel may include reinforcing members disposed between the barrel part and the clamp rings, and the reinforcing member may have an accommodation groove that accommodates the clamp ring.

According to the embodiment of the present disclosure described above, it is possible to obtain an effect of improving the spatial utilization and the degree of design freedom.

In particular, according to the embodiment of the present disclosure, it is possible to obtain an advantageous effect of ensuring the sufficient storage space of the pressure vessel and contributing to the miniaturization of the pressure vessel.

In addition, according to the embodiment of the present disclosure, it is possible to obtain an advantageous effect of ensuring structural rigidity of the pressure vessel and minimizing the amount of use of the carbon fiber composite material.

In addition, according to the embodiment of the present disclosure, it is possible to obtain an advantageous effect of improving durability and stability.

In addition, according to the embodiment of the present disclosure, it is possible to obtain an advantageous effect of improving efficiency of the pressure vessel, reducing a weight of the pressure vessel, and reducing manufacturing costs.

In addition, according to the embodiment of the present disclosure, it is possible to obtain an advantageous effect of simplifying the manufacturing process and improving the manufacturing efficiency.

DETAILED DESCRIPTION

Figure 1:
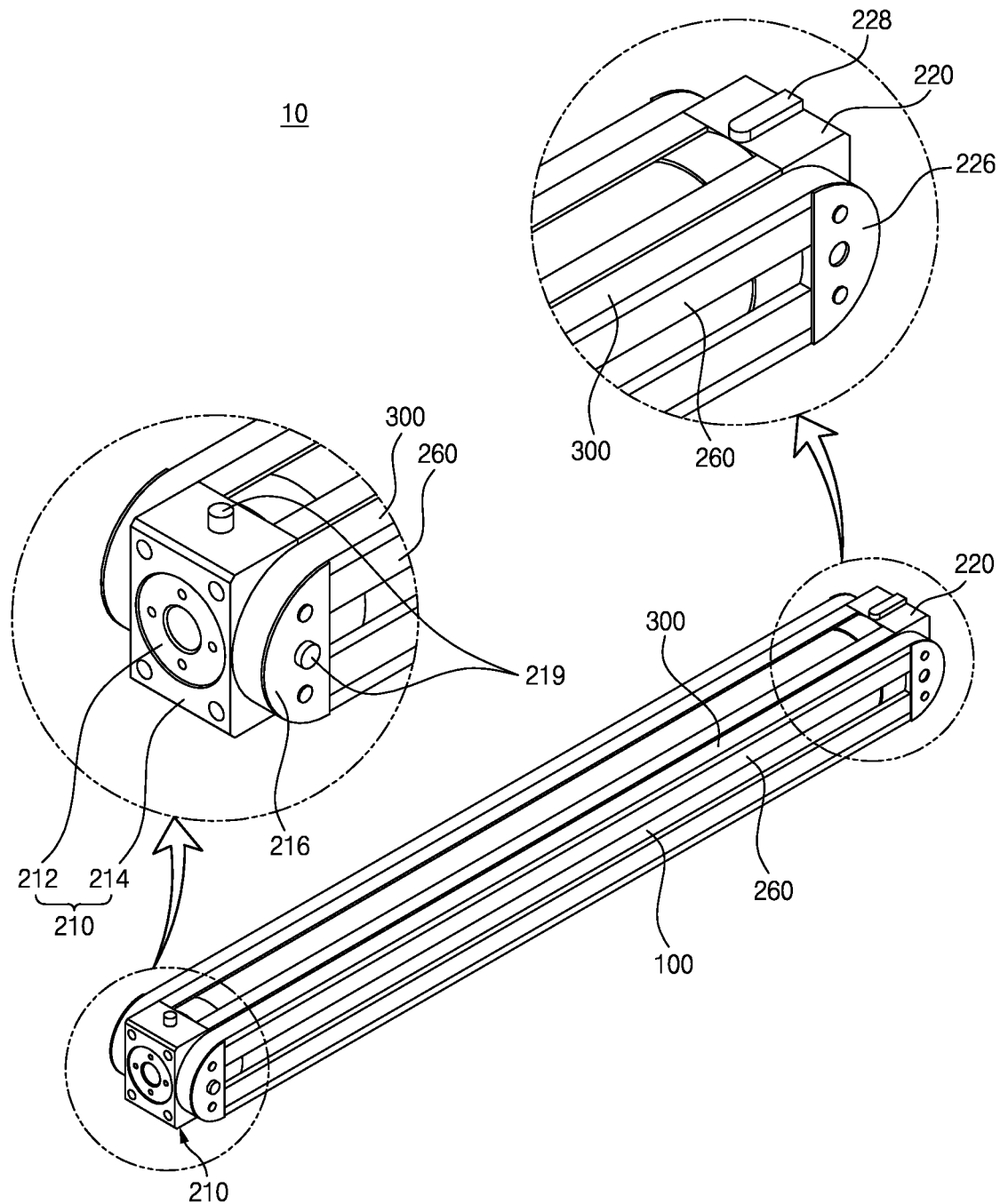
FIG. 1 is a view for explaining a pressure vessel according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 19, a pressure vessel 10 according to an embodiment of the present disclosure includes: a barrel part 100 disposed in a predefined square area 20 and having a diameter corresponding to a length of one side of the square area 20; a first nozzle member 210 disposed at one end of the barrel part 100; a second nozzle member 220 disposed at an opposite end of the barrel part 100; and clamp rings 300 disposed in the square area 20, positioned outside the barrel part 100, and configured to lock the first and second nozzle members 210 and 220 to the barrel part 100.

For reference, the pressure vessel 10 according to the embodiment of the present disclosure may be used to store a high-pressure fluid (liquid or gas). The present disclosure is not restricted or limited by the type and the properties of the fluid stored in the pressure vessel 10.

Hereinafter, an example will be described in which the pressure vessel 10 according to the embodiment of the present disclosure is used as a hydrogen tank of a hydrogen storage system applied to a hydrogen vehicle.

Figure 2:
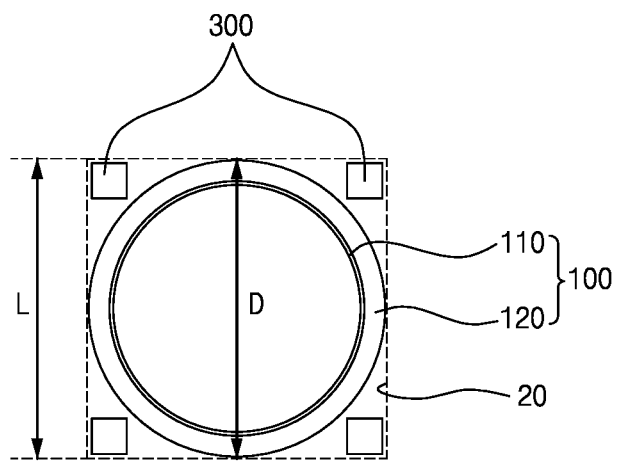
FIG. 2 is a view for explaining a square area of the pressure vessel according to the embodiment of the present disclosure.

Referring to FIG. 2, the barrel part 100 is disposed in the predefined square area 20 and have a diameter corresponding to a length of one side of the square area 20.

In this case, the square area 20 may be defined as a space provided in the form of a quadrangular box having a square cross-section (i.e., a cross-section having four sides equal in length to one another and four vertices all having a right angle) capable of accommodating the barrel part 100.

A size of the square area 20 (i.e., a length of one side of the square area) may be variously changed in accordance with required conditions and design specifications. The present disclosure is not restricted or limited by the size of the square area 20.

Figure 3:
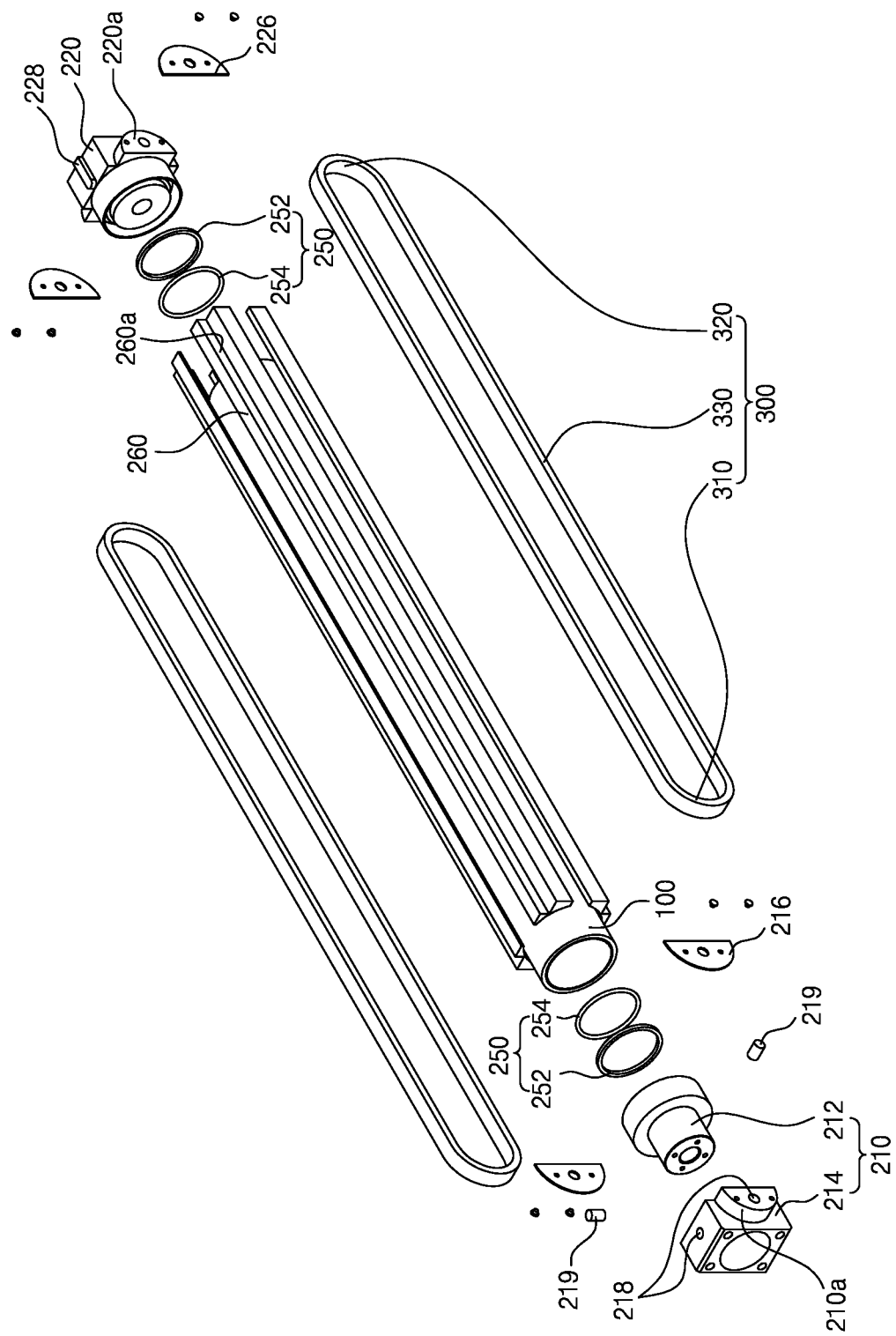
FIG. 3 is an exploded perspective view for explaining the pressure vessel according to the embodiment of the present disclosure.
Figure 4:
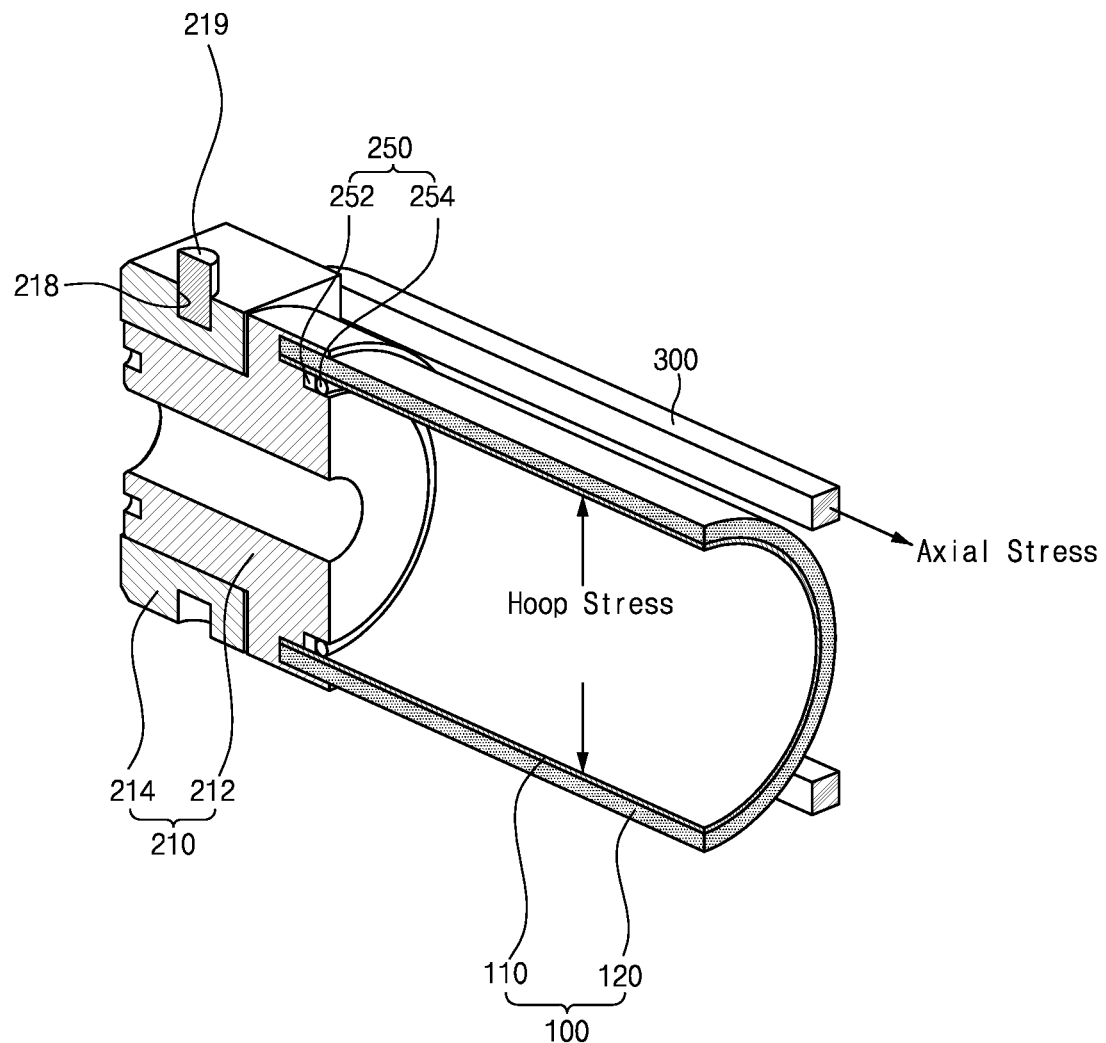
FIG. 4 is a view for explaining a barrel part and a clamp ring of the pressure vessel according to the embodiment of the present disclosure.

Referring to FIGS. 2 to 4, the barrel part 100 has a hollow cylindrical shape having a circular cross-section. A diameter (outer diameter) D of the barrel part 100 is defined as a length corresponding to a length L of one side of the square area 20.

Figure 19:
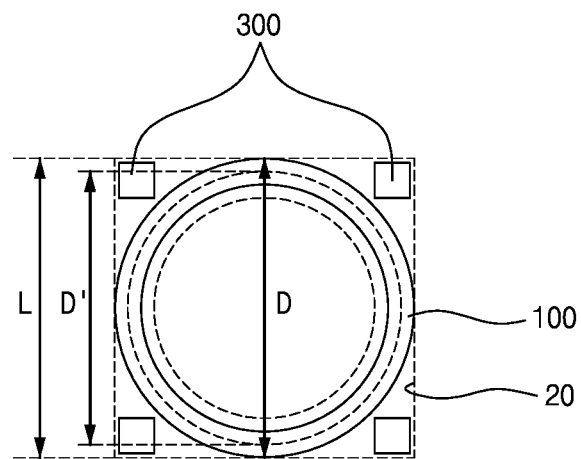
FIG. 19 is a view for explaining a state in which the barrel part of the pressure vessel according to the embodiment of the present disclosure is not expanded.

According to the exemplary embodiment of the present disclosure, as illustrated in FIG. 19, the diameter D of the barrel part 100 may be determined as a value between a maximum diameter (e.g., D) when the barrel part 100 is maximally expanded immediately before the barrel part 100 bursts and a minimum diameter (e.g., D') when the barrel part 100 is in a non-expanded state.

In this case, the maximum diameter of the barrel part 100 may be understood as a diameter in a state in which the barrel part 100 is maximally expanded but the barrel part 100 does not burst. The minimum diameter of the barrel part 100 may be understood as a diameter in a state in which the barrel part 100 is not expanded (e.g., a state in which the barrel part 100 is thermally contracted under a lowest-temperature environment among environments in which the barrel part is managed or an initially manufactured state in which the barrel part 100 is not subjected to an internal pressure test).

Therefore, the length L of one side of the square area 20 may be determined as a value between the maximum diameter (e.g., D) and the minimum diameter (e.g., D') of the barrel part 100.

In particular, a maximum working pressure of the barrel part 100 may be lower than a bursting pressure (i.e., a pressure at which the barrel part bursts) of the barrel part 100.

In addition, referring to FIG. 19, when the diameter D of the barrel part 100 is the maximum diameter when the barrel part 100 is maximally expanded, the diameter D' of the barrel part 100 is in a non-expanded state (e.g., an initially manufactured state in which the barrel part 100 is not subjected to an internal pressure test) may be defined as a length (D'<L) shorter than the length L of one side of the square area.

The barrel part 100 may have various structures having the diameter (D=L) corresponding to the length L of one side of the square area 20. The present disclosure is not restricted or limited by the structure of the barrel part 100.

For example, the barrel part 100 may include a liner 110 having a storage space therein, and a reinforcing layer 120 configured to surround an outer peripheral surface of the liner 110.

The liner 110 may be a hollow cylindrical structure having the storage space therein, and the storage space may store high-pressure hydrogen.

An opening portion (mounting space) into which the first nozzle member 210 is inserted and mounted may be provided at one end (a left end based on FIG. 3) of the liner 110, and an opening portion (mounting space) into which the second nozzle member 220 is inserted and mounted may be provided at an opposite end (based on a right end based on FIG. 3) of the liner 110.

The liner 110 may be variously changed in material in accordance with required conditions and design specifications. The present disclosure is not restricted or limited by the material of the liner 110.

In particular, the liner 110 may be made of a nonmetallic material such as high-density plastic with excellent restoring force and excellent fatigue resistance. According to another embodiment of the present disclosure, the liner may be made of metal or other plastic materials.

The reinforcing layer 120 is provided to ensure resistance (structural rigidity) against stress applied to the liner 110 and surrounds the entire outer peripheral surface of the liner 110.

The reinforcing layer 120 may have various structures and be made of various materials in accordance with required conditions and design specifications. The present disclosure is not restricted or limited by the structure and material of the reinforcing layer 120.

According to the exemplary embodiment of the present disclosure, the reinforcing layer 120 may be made of at least one of reinforcing fiber, thermosetting resin, or thermoplastic resin.

Hereinafter, an example will be described in which the reinforcing layer 120 is made of a carbon fiber composite material which is a kind of reinforcing fiber.

For example, the reinforcing layer 120 may be made by winding a carbon fiber composite material around the outer surface (outer peripheral surface) of the liner 110 using a typical winding device, and the carbon fiber composite material may be made by impregnating carbon fiber with epoxy, thermosetting resin, or the like.

The structure of the wound carbon fiber composite material and the method of winding the carbon fiber composite material may be variously changed in accordance with required conditions and design specifications. The present disclosure is not limited or restricted by the method of winding the carbon fiber composite material. For example, the reinforcing layer 120 may be made by winding multiple layers of the carbon fiber composite material around the outer surface of the liner 110 in various patterns (e.g., clockwise winding, counterclockwise winding, oblique winding, etc.).

In particular, the reinforcing layer 120 may serve to ensure structural rigidity against stress (e.g., maximum hoop stress) which is applied mainly in the circumferential direction among types of stress applied to the liner 110.

According to the exemplary embodiment of the present disclosure, the reinforcing layer 120 may include: a first reinforcing layer (hoop layer) (not illustrated) made by winding the carbon fiber composite material around the outer surface of the liner 110 at a winding angle of 90° based on an axis of the liner 110; and a second reinforcing layer (helical layer) (not illustrated) made by winding the carbon fiber composite material around the outer surface of the liner 110 at a winding angle of ±45° based on the axis of the liner 110.

The first reinforcing layer may serve to ensure resistance (structural rigidity) against the stress (hoop stress) which is applied mainly in the circumferential direction among types of stress applied to the liner 110. In contrast, the second reinforcing layer may serve to resist torsion, bending, and stress (axial stress) applied mainly in the longitudinal direction (an axial direction of the liner 110) among types of stress applied to the liner 110.

The first and second reinforcing layers may be alternately stacked in a radial direction of the liner 110. The present disclosure is not restricted or limited by the thicknesses of the first and second reinforcing layers.

For reference, in the embodiment of the present disclosure described above, the example has been described in which the reinforcing layer 120 includes both the first and second reinforcing layers. However, according to another embodiment of the present disclosure, only any one of the first and second reinforcing layers may constitute the reinforcing layer.

According to another embodiment of the present disclosure, the reinforcing layer may be made by applying a process method such as filament winding, braiding, multi-filament winding, or the like using an intermediate material (prepreg, towpreg, etc.) made by impregnating reinforcing fiber (carbon fiber, fiberglass, aramid fiber, limestone fiber, etc.) with thermosetting or thermoplastic resin in advance and then partially curing the resin.

Figure 5:
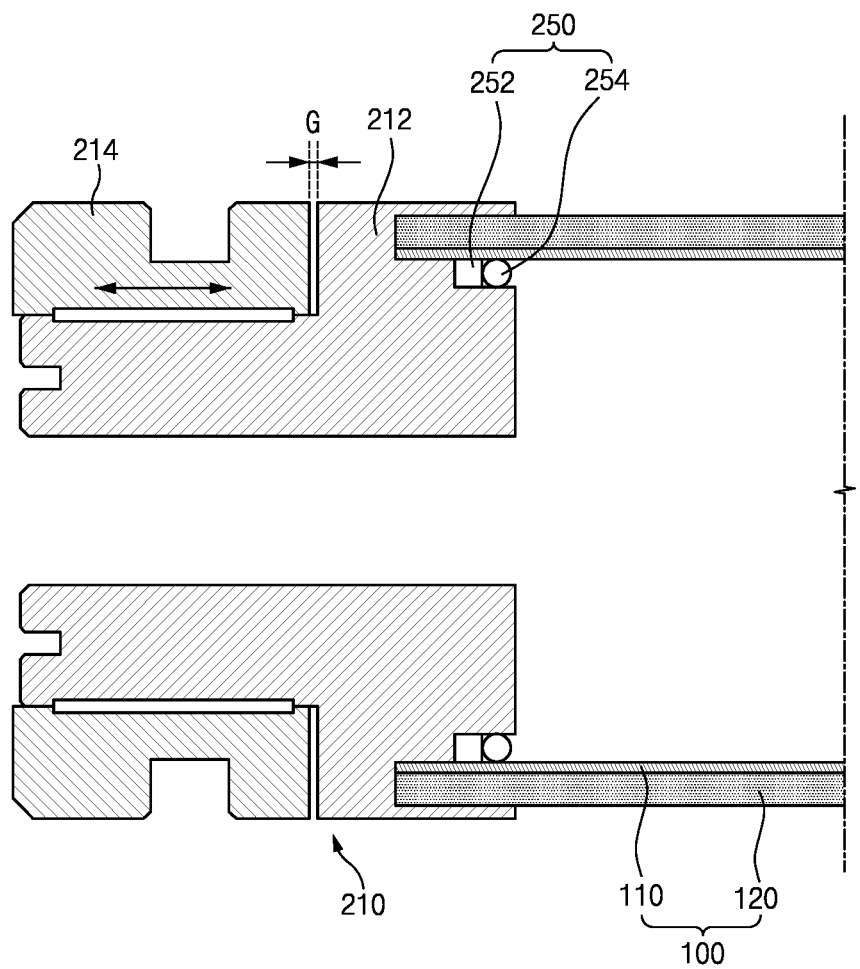
FIG. 5 is a view for explaining a first nozzle member of the pressure vessel according to the embodiment of the present disclosure.

Referring to FIG. 5, the first nozzle member 210 may support one end (a first side clamp part) of each of the clamp rings 300 while closing one end (e.g., a left end based on FIG. 3) of the barrel part 100. The first nozzle member 210 may have a nozzle hole (not illustrated) for connecting various types of components such as valves and pipes.

The first nozzle member 210 may have various structures capable of supporting the clamp rings 300 while closing one end of the barrel part 100. The present disclosure is not restricted or limited by the structure of the first nozzle member 210.

According to the exemplary embodiment of the present disclosure, the first nozzle member 210 may include a nozzle body 212 coupled to one end of the barrel part 100, and a nozzle cover 214 configured to surround the nozzle body 212. The clamp rings 300 may be coupled to the nozzle cover 214.

For example, first seating portions 210a may protrude from two opposite lateral surfaces of the first nozzle member 210 (the nozzle cover), and one end (the first side clamp part) of each of the clamp rings 300 may be seated on the first seating portion 210a. In particular, the first seating portion 210a may have a semicircular shape, and one end of the clamp ring 300 may be in close contact with and supported on the first seating portion 210a. Further, the first seating portion 210a may correspond in width to the clamp ring 300.

According to another embodiment of the present disclosure, the first seating portion may be disposed on only any one of the two opposite lateral surfaces of the first nozzle member.

The first nozzle member 210 may be variously changed in material in accordance with required conditions and design specifications. For example, the first nozzle member 210 may be made of a typical metallic or plastic material.

For reference, in the embodiment of the present disclosure, the example has been described in which the first nozzle member 210 includes the separable two components (the nozzle body and the nozzle cover). However, according to another embodiment of the present disclosure, the first nozzle member may include a single component or three or more components.

Figure 6:
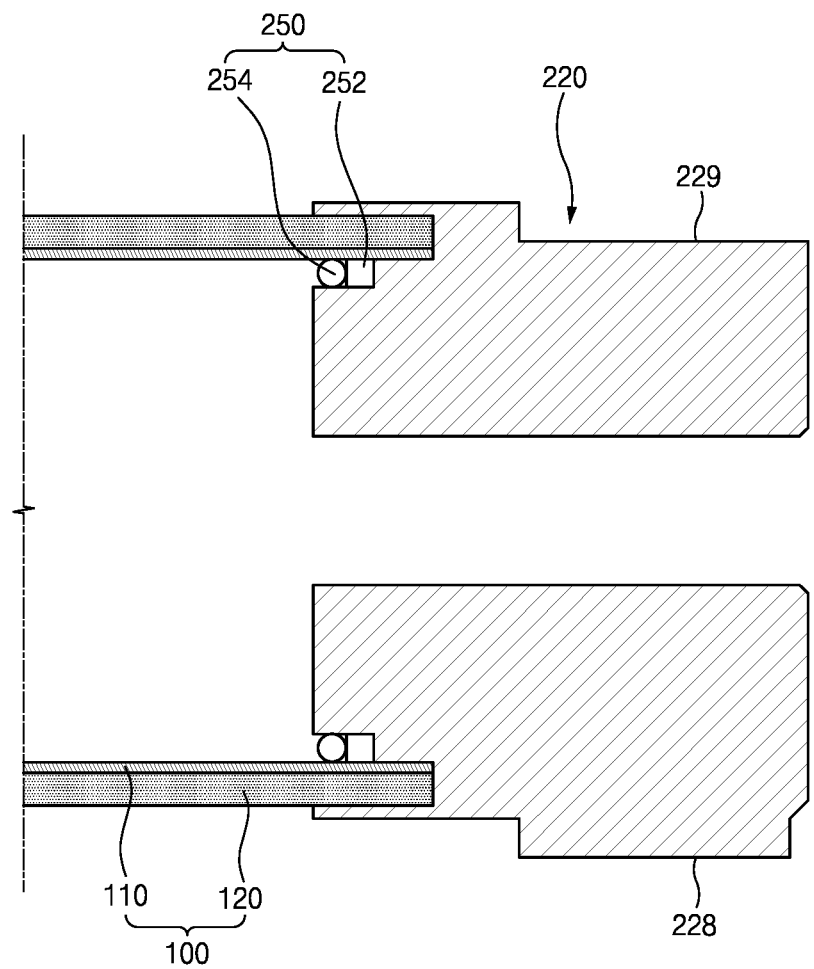
FIG. 6 is a view for explaining a second nozzle member of the pressure vessel according to the embodiment of the present disclosure.

Referring to FIG. 6, the second nozzle member 220 may support an opposite end (a second side clamp part) of each of the clamp rings 300 while closing the opposite end (e.g., a right end based on FIG. 3) of the barrel part 100. The second nozzle member 220 may have a nozzle hole (not illustrated) for connecting various types of components such as valves and pipes.

The second nozzle member 220 may have various structures capable of supporting the clamp ring 300 while closing the opposite end of the barrel part 100. The present disclosure is not restricted or limited by the structure of the second nozzle member 220.

For example, second seating portions 220a may protrude from two opposite lateral surfaces of the second nozzle member 220, and the opposite end (the second side clamp part) of each of the clamp rings 300 may be seated on the second seating portion 220a. In particular, the second seating portion 220a may have a semicircular shape, and the opposite end of the clamp ring 300 may be in close contact with and supported on the second seating portion 220a. Further, the second seating portion 220a may correspond in width to the clamp ring 300.

According to another embodiment of the present disclosure, the second seating portion may be disposed on only any one of the two opposite lateral surfaces of the second nozzle member.

The second nozzle member 220 may be variously changed in material in accordance with required conditions and design specifications. For example, the second nozzle member 220 may be made of a typical metallic or plastic material.

In the embodiment of the present disclosure illustrated and described above, the example has been described in which the second nozzle member 220 includes only the single component. However, according to another embodiment of the present disclosure, like the first nozzle member, two or more components (e.g., a nozzle body and a nozzle cover) may constitute the second nozzle member.

For reference, in the embodiment of the present disclosure illustrated and described above, the example has been described in which the first and second nozzle members 210 and 220 each have the nozzle hole for connecting the components such as valves and pipes. However, according to another embodiment of the present disclosure, only any one of the first and second nozzle members may have the nozzle hole.

Referring to FIG. 5, according to the exemplary embodiment of the present disclosure, the nozzle cover 214 may be moved in the longitudinal direction of the barrel part 100 relative to the nozzle body 212.

For example, a first screw thread portion (not illustrated) may be provided on an outer peripheral surface of the nozzle body 212, and a second screw thread portion (not illustrated) may be provided on an inner peripheral surface of the nozzle cover 214 and engage with the first screw thread portion.

As the nozzle body 212 rotates relative to the nozzle cover 214, the nozzle cover 214 may rectilinearly move in the longitudinal direction of the barrel part 100 relative to the nozzle body 212, such that a gap (a gap in the longitudinal direction of the barrel part) G between the nozzle body 212 and the nozzle cover 214 may be adjusted.

This configuration makes it easy to assemble the clamp rings 300 and securely support a state in which the clamp rings 300 are mounted (a state in which the clamp rings 300 are seated on the first and second seating portions 210*a* and 220*a*).

That is, before the clamp rings 300 are assembled with (mounted on) the first and second nozzle members 210 and 220, the nozzle cover 214 may move toward the nozzle body 212 (move in a direction in which the nozzle cover becomes close to a center of the barrel part). When the nozzle cover 214 moves toward the nozzle body 212, the gap G between the nozzle body 212 and the nozzle cover 214 may decrease, such that a distance between the first and second seating portions 210*a* and 220*a* may decrease to a distance smaller than a length of the clamp ring 300 in the longitudinal direction of the barrel part 100. Therefore, the two opposite ends of the clamp ring 300 may be easily disposed on the first and second nozzle members 210 and 220.

After the clamp rings 300 are seated on the first and second seating portions 210*a* and 220*a*, the nozzle cover 214 may move away from the nozzle body 212 (move in a direction in which the nozzle cover becomes distant from the center of the barrel part). When the nozzle cover 214 moves away from the nozzle body 212, the gap G between the nozzle body 212 and the nozzle cover 214 may increase, such that the distance between the first and second seating portions 210*a* and 220*a* may increase. Therefore, the clamp rings 300 may be tensely pulled, and the state in which the clamp rings 300 are mounted may be securely maintained.

Referring to FIGS. 1 to 6, the clamp rings 300 are configured to lock the first and second nozzle members 210 and 220 to the barrel part 100. The clamp rings 300 are disposed in the predefined square area 20 and positioned outside the barrel part 100.

In this case, the configuration in which the clamp rings 300 are disposed in the square area 20 and positioned outside the barrel part 100 may mean that the clamp rings 300 are disposed in a space (approximately an edge portion of the square area) between a boundary of the square area 20 and an outer surface of the barrel part 100.

The clamp rings 300 are configured to ensure structural rigidity against stress (axial stress) which is applied mainly in the longitudinal direction (the axis direction of the liner 110) among types of stress applied to the liner 110.

In particular, the clamp rings 300 are expandable or contractable in the axis direction of the liner 110 in accordance with stress (axial stress) applied in the axis direction of the liner 110.

The clamp ring 300 may have various structures capable of locking the first and second nozzle members 210 and 220 to the barrel part 100. The present disclosure is not restricted or limited by the structure of the clamp ring 300.

For example, the clamp ring 300 may include a first side clamp part 310 supported on the first nozzle member 210, a second side clamp part 320 supported on the second nozzle member 220, and a connection clamp part 330 configured to continuously connect the first and second side clamp parts 310 and 320. The clamp ring 300 may be provided in the form of a continuously connected ring.

Hereinafter, an example will be described in which the clamp ring 300 has a square cross-sectional shape.

According to the exemplary embodiment of the present disclosure, the first side clamp part 310 may be in close contact with and supported on the first seating portion 210*a*, and the second side clamp part 320 may be in close contact with and supported on the second seating portion 220*a*.

The clamp ring 300 may be made of various materials in accordance with required conditions and design specifications. The present disclosure is not restricted or limited by the material of the clamp ring 300.

According to the exemplary embodiment of the present disclosure, the clamp ring 300 may be made of at least one of reinforcing fiber, thermosetting resin, or thermoplastic resin.

Hereinafter, an example will be described in which the clamp ring 300 is made of a carbon fiber composite material which is a kind of reinforcing fiber.

For example, the clamp ring 300 may be made by winding the carbon fiber composite material around an outer surface of a jig (not illustrated) using a typical winding device, and the carbon fiber composite material may be made by impregnating carbon fiber with epoxy, thermosetting resin, and the like. The clamp rings 300 may be assembled to partially surround the first nozzle member 210 (e.g., the first seating portions) and the second nozzle member 220 (e.g., the second seating portions) in the state in which the first and second nozzle members 210 and 220 are coupled to the two opposite ends of the barrel part 100.

According to another embodiment of the present disclosure, the clamp rings 300 may be made by winding the carbon fiber composite materials directly around the first nozzle member 210 (e.g., the first seating portions) and the second nozzle member 220 (e.g., the second seating portions).

That is, according to another embodiment of the present disclosure, the clamp rings 300 may be provided by winding reinforcing fiber (e.g., the carbon fiber composite materials) to partially surround the first nozzle member 210 (e.g., the first seating portions) and the second nozzle member 220 (e.g., the second seating portions) in the state in which the first and second nozzle members 210 and 220 are coupled to the two opposite ends of the barrel part 100.

For reference, the structure of the wound carbon fiber composite material and the method of winding the carbon fiber composite material for providing the clamp ring 300 may be variously changed in accordance with required conditions and design specifications. The present disclosure is not limited or restricted by the method of winding the carbon fiber composite material.

In the embodiment of the present disclosure illustrated and described above, the example has been described in which the clamp ring 300 has a square cross-sectional shape. However, the clamp ring 300 may be variously changed in cross-sectional shape and structure in accordance with required conditions and design specifications.

Figure 7:
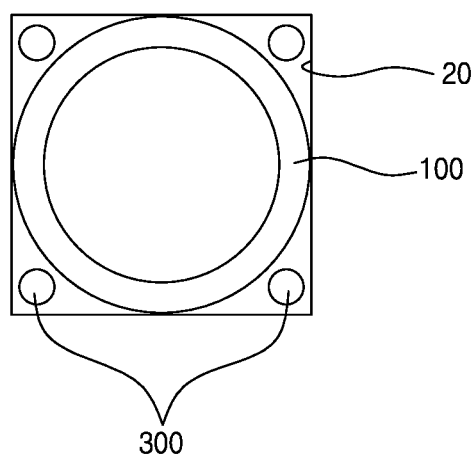
FIGS. 7 to 9 are views for explaining a modified example of the clamp ring of the pressure vessel according to the embodiment of the present disclosure.
Figure 8:
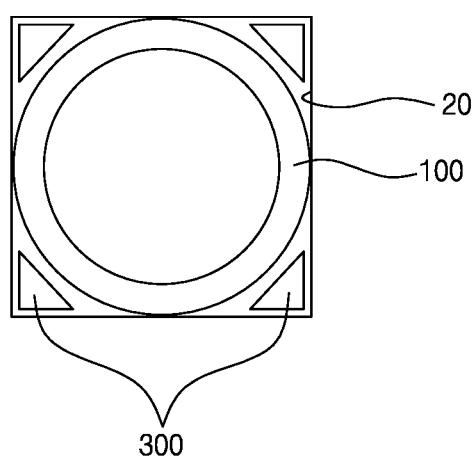
Figure 9:
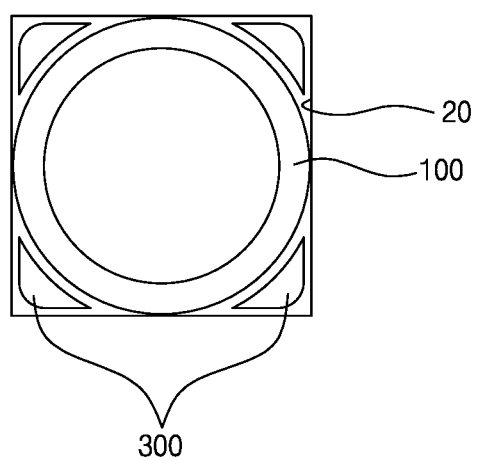

Referring to FIGS. 7 to 9, according to another exemplary embodiment of the present disclosure, the clamp ring 300 may have a circular cross-section or a non-circular cross-section.

For example, referring to FIG. 7, the clamp ring 300 may have a circular cross-sectional shape.

As another example, referring to FIG. 8, the clamp ring 300 may have a triangular cross-sectional shape.

As still another example, referring to FIG. 9, the clamp ring 300 may have a non-circular cross-sectional shape such as a curved shape or a straight shape.

Referring to FIGS. 1 and 3, according to the exemplary embodiment of the present disclosure, the pressure vessel 10 may include first side plates 216 coupled to the first seating portions 210a and configured to cover lateral sides of the first side clamp parts 310, and second side plates 226 coupled to the second seating portions 220a and configured to cover lateral sides of the second side clamp parts 320.

Since the first side plates 216 and the second side plates 226 are provided as described above, it is possible to obtain an advantageous effect of inhibiting the separation of the clamp rings 300 and stably maintaining the state in which the clamp rings 300 are seated on the first and second seating portions 210a and 220a.

The first and second side plates 216 and 226 may have various structures capable of covering the lateral sides of the first and second side clamp parts 310 and 320. The present disclosure is not restricted or limited by the structures and shapes of the first and second side plates 216 and 226.

For example, the first side plate 216 may have a semicircular shape corresponding to the first seating portion 210a, and the second side plate 226 may have a semicircular shape corresponding to the second seating portion 220a.

The first side plate 216 may be fixed to the first seating portion 210a by a fastening member (not illustrated) such as a bolt or a pin, and the second side plate 226 may be fixed to the second seating portion 220a by a fastening member (not illustrated) such as a bolt or a pin.

For reference, in the embodiment of the present disclosure, the example has been described in which the second side plate 226 is coupled to (assembled with) the second seating portion 220a. However, according to another embodiment of the present disclosure, the second side plate 226 and the second nozzle member 220 may be provided as a unitary body.

The first and second side plates 216 and 226 may be variously changed in material in accordance with required conditions and design specifications. The present disclosure is not restricted or limited by the materials of the first and second side plates 216 and 226.

In particular, the first and second side plates 216 and 226 may each be made of engineering plastic with excellent strength and elasticity. According to another embodiment of the present disclosure, the first and second side plates may be made of metal or other plastic materials.

Referring to FIGS. 3 to 6, according to the exemplary embodiment of the present disclosure, the pressure vessel 10 may include a sealing part 250 configured to seal a gap between the barrel part 100 and at least one of the first or second nozzle members 210 and 220.

Hereinafter, an example will be described in which the sealing parts 250 are respectively disposed in the gap between the first nozzle member 210 and the barrel part 100 and the gap between the second nozzle member 220 and the barrel part 100.

The sealing part 250 may have various structures capable of sealing the gap between the barrel part 100 and the first nozzle member 210 (or the second nozzle member).

For example, the sealing part 250 may include a first sealing member 252 configured to seal the gap, and a second sealing member 254 disposed adjacent to (e.g., in close contact with) the first sealing member 252 and configured to seal the gap.

An O-ring made of an elastomer (EPDM) such as rubber may be used as the first sealing member 252. The present disclosure is not restricted or limited by the material and structure of the first sealing member 252.

The second sealing member 254 may be provided in the form of a ring made of a material identical or similar to the material of the first sealing member 252. The second sealing member 254 may be disposed adjacent to the first sealing member 252 and serve as a back-up ring.

According to the embodiment of the present disclosure as described above, the gap between the barrel part 100 and the first nozzle member 210 (or the second nozzle member) may be sealed by the dual sealing structure implemented by the first and second sealing members 252 and 254. Therefore, it is possible to obtain an advantageous effect of improving safety and reliability and effectively inhibiting a fluid (e.g., hydrogen) from leaking through the gap between the barrel part 100 and the first nozzle member 210 (or the second nozzle member).

According to another embodiment of the present disclosure, the sealing part may include any one of the first and second sealing members.

Meanwhile, in the embodiment of the present disclosure illustrated and described above, the example has been described in which only one pressure vessel 10 is used. However, according to another embodiment of the present disclosure, a plurality of pressure vessels 10 may be arranged in a single layer or multiple layers.

Referring to FIGS. 10 to 18, according to the exemplary embodiment of the present disclosure, the square area 20 may be provided in plural, and the plurality of square areas 20 may be disposed adjacent to one another to define a matrix. The barrel parts 100 may be respectively disposed in the square areas 20.

In particular, the plurality of square areas 20, which respectively accommodates the pressure vessels 10, may be arranged to define a one-dimensional matrix or a two-dimensional matrix in accordance with required conditions and design specifications.

For example, the plurality of square areas 20 may be arranged to define a one-dimensional matrix of $1*n_1$ (here, $n_1$ is a natural number) or arranged to define a two-dimensional matrix of $(n_2+1)*(n_2+1)$ (here, $n_2$ is a natural number equal to or lager than 1 ($n_2 \geq 1$)).

Figure 10:
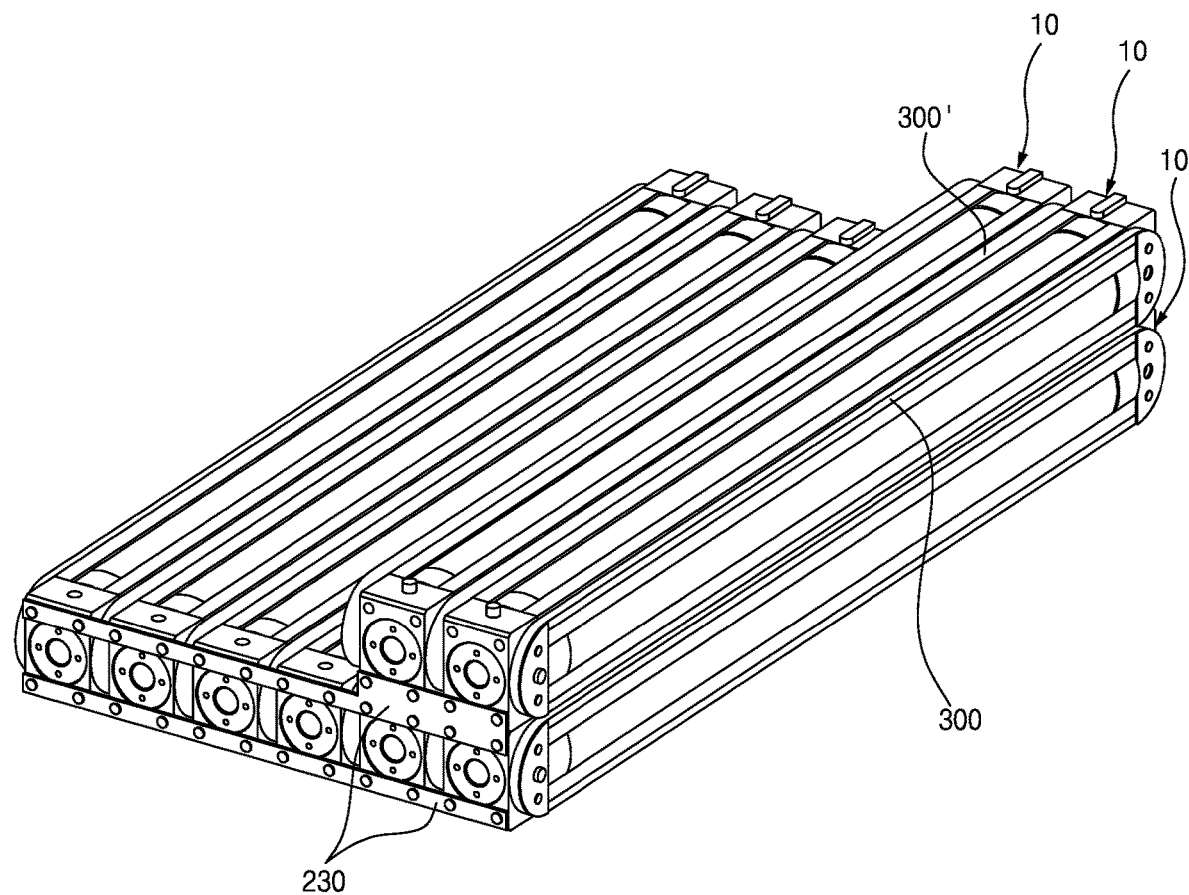
FIG. 10 is a view for explaining an arrangement pattern of the pressure vessels according to the embodiment of the present disclosure.

For example, referring to FIG. 10, at least some of the plurality of pressure vessels 10 may be stacked in two layers.

For example, six pressure vessels 10 may be arranged side by side (in a matrix of 1*6) in a first layer part, and three pressure vessels 10 may be arranged side by side (in a matrix of 1*3) in a second layer part (disposed above the first layer part) so that the first layer part and the second layer part partially define a two-layer structure.

Figure 12:
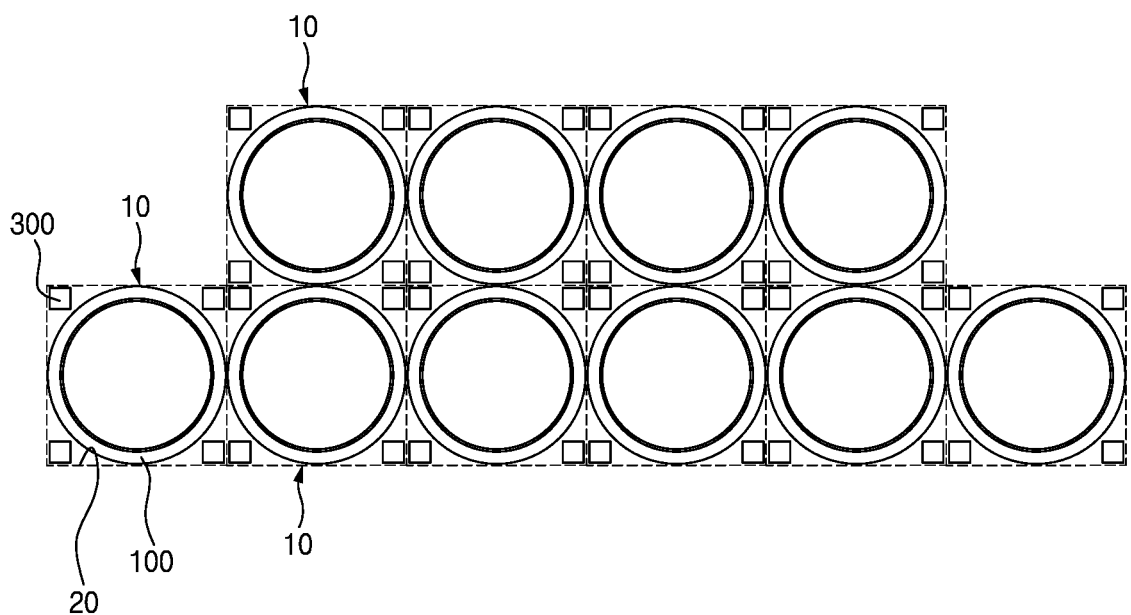
Figure 13:
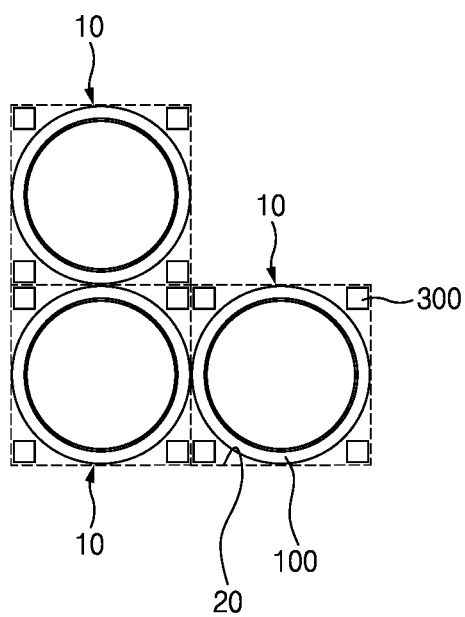

According to another embodiment of the present disclosure, as illustrated in FIGS. 12 to 13, the number of pressure vessels 10 arranged in the first and second layer parts may be changed. The present disclosure is not restricted or limited by the number of pressure vessels 10 respectively arranged in the layer parts.

Figure 11:
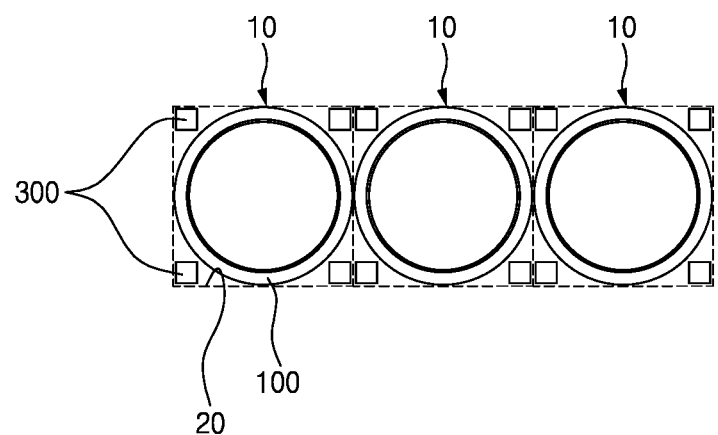
FIGS. 11 to 14 are views for explaining various arrangement patterns of the pressure vessels according to the embodiment of the present disclosure.
Figure 14:
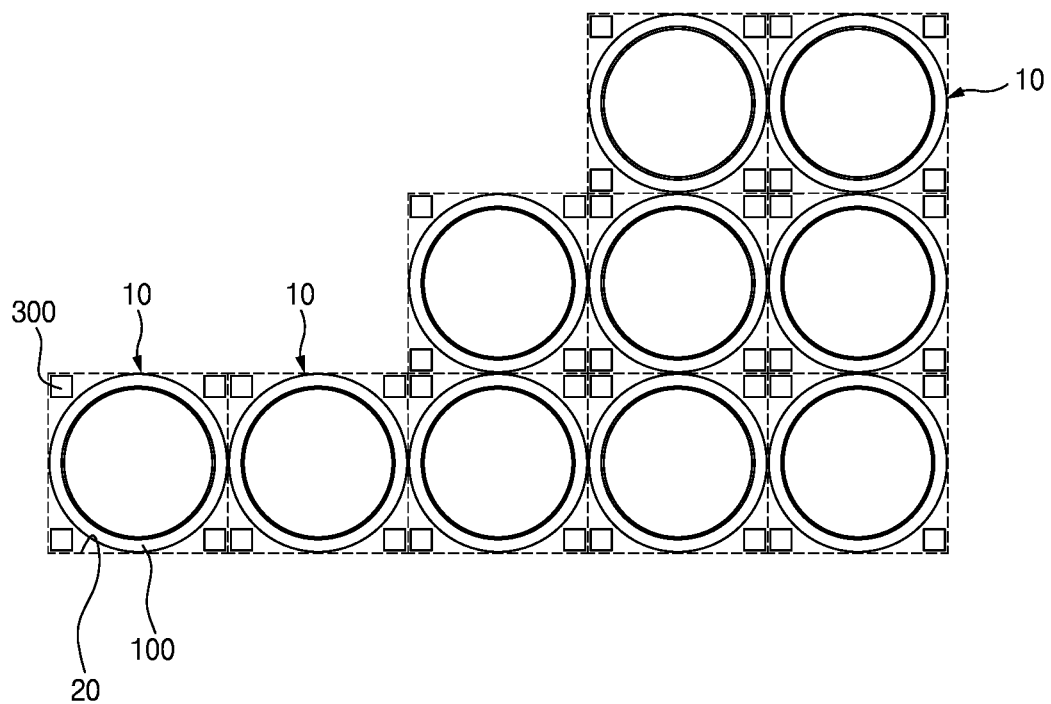

Alternatively, as illustrated in FIG. 11, the plurality of pressure vessels 10 may be arranged in a single layer. Alternatively, as illustrated in FIG. 14, the plurality of pressure vessels 10 may be arranged in three layers.

According to yet another embodiment of the present disclosure, the plurality of pressure vessels 10 (in the square area) may be arranged to define a square matrix in which the number of columns is equal to the number of rows.

Figure 15:
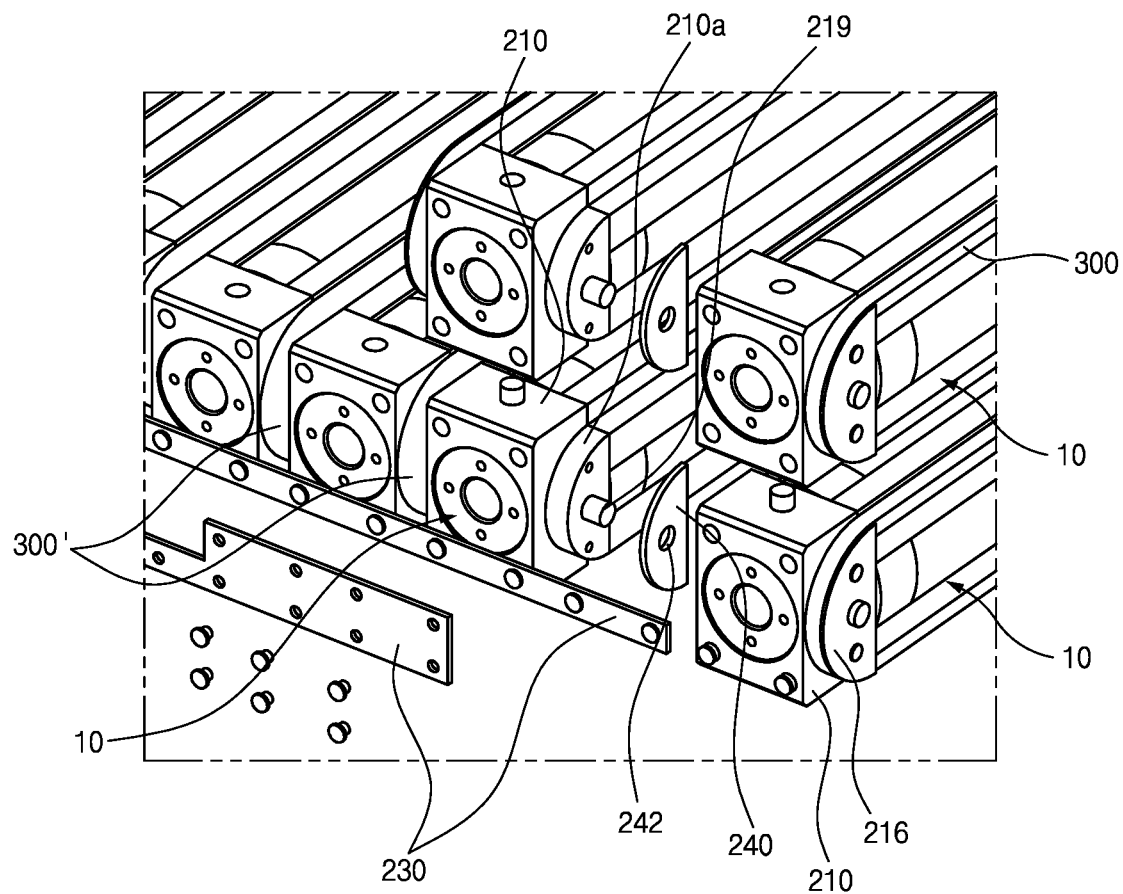
FIG. 15 is a view for explaining a spacer of the pressure vessel according to the embodiment of the present disclosure.
Figure 16:
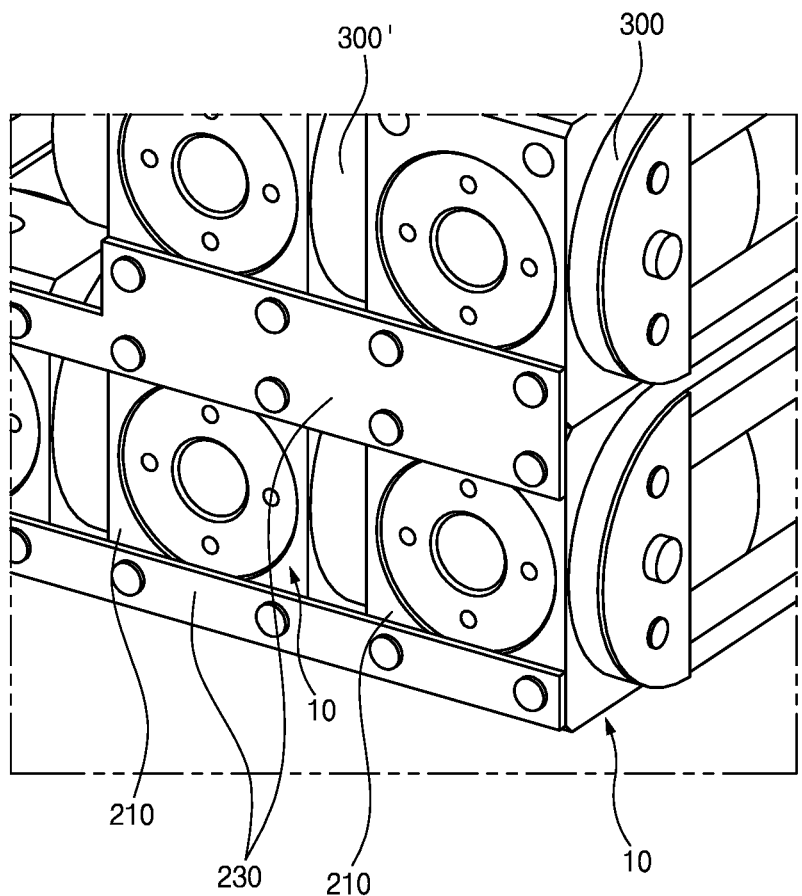
FIG. 16 is a view for explaining a connection member of the pressure vessel according to the embodiment of the present disclosure.

Referring to FIGS. 1, 3, and 15, according to the exemplary embodiment of the present disclosure, the pressure vessels 10 may include coupling holes 218 provided in the adjacent first nozzle members 210, respectively, and a coupling member 219 having one end coupled to any one of the adjacent first nozzle members 210 and an opposite end coupled to other of the adjacent first nozzle members 210.

In this case, the adjacent first nozzle members 210 may be defined as a concept including both the first nozzle members 210 disposed adjacent to one another in an upward/downward direction (e.g., based on FIG. 15) and the first nozzle members 210 disposed adjacent to one another in a leftward/rightward direction (e.g., based on FIG. 15).

Hereinafter, an example will be described in which the coupling holes 218 are respectively provided in an upper surface, a bottom surface, and the two opposite lateral surfaces of the first nozzle member 210. Alternatively, the coupling holes may be provided in some of the upper surface, the bottom surface, and the two opposite lateral surfaces of the first nozzle member.

A typical pin or bolt capable of being coupled to the adjacent coupling holes 218 may be used as the coupling member 219. The present disclosure is not restricted or limited by the type and structure of the coupling member 219.

For example, the coupling members 219 configured to be coupled to the coupling holes 218 provided in the upper surface and the bottom surface of the first nozzle member 210 may couple the first nozzle members 210 disposed adjacent to one another in the upward/downward direction. The coupling members 219 configured to be coupled to the coupling holes 218 provided in the two opposite lateral surfaces of the first nozzle member 210 may couple the first nozzle members 210 disposed adjacent to one another in the leftward/rightward direction.

Figure 18:
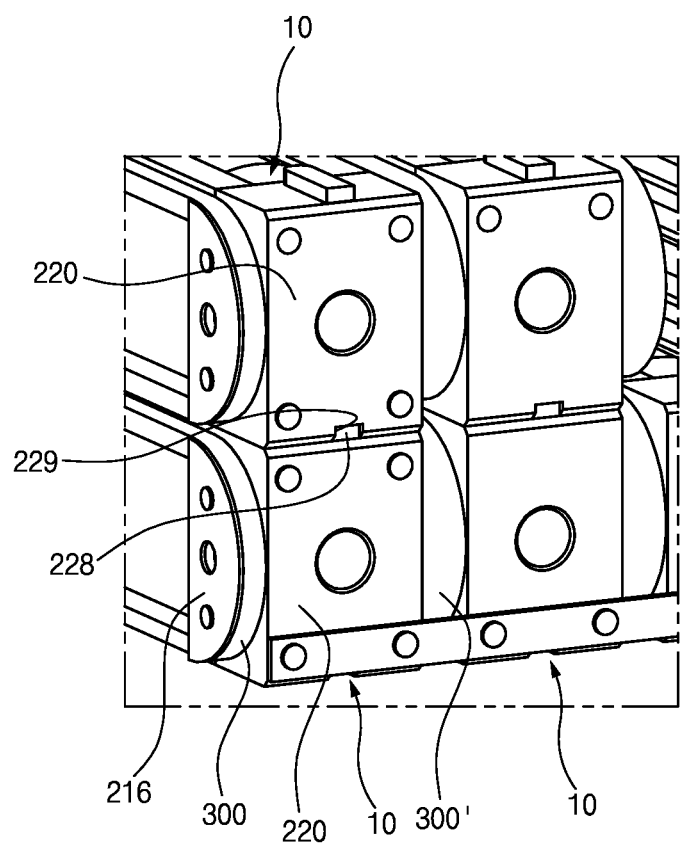
FIG. 18 is a view for explaining a guide protrusion and a guide groove of the pressure vessel according to the embodiment of the present disclosure.

In addition, referring to FIG. 18, according to the exemplary embodiment of the present disclosure, the pressure vessel 10 may include a guide protrusion 228 provided on any one of the adjacent second nozzle members 220, and a guide groove 229 provided in other of the adjacent second nozzle members 220 and configured to accommodate the guide protrusion 228 so that the guide protrusion 228 is slidable in the longitudinal direction of the barrel part 100.

For example, the guide protrusion 228 may be provided on an upper surface of the second nozzle member 220 which is disposed at a lower side among the second nozzle members 220 disposed adjacent to one another in the upward/downward direction. The guide groove 229 may be provided in the bottom surface of the second nozzle member 220 which is disposed at an upper side among the second nozzle member 220 disposed adjacent to one another in the upward/downward direction.

The guide protrusion 228 and the guide groove 229 may be variously changed in structure in accordance with required conditions and design specifications. For example, the guide protrusion 228 and the guide groove 229 may each have a quadrangular cross-sectional shape.

The adjacent second nozzle members 220 respectively have the guide groove 229 and the guide protrusion 228 as described above. Therefore, when any one of the adjacent barrel parts 100 is expanded (expanded in the longitudinal direction), the relative movement between the second nozzle members 220 in the longitudinal direction of the barrel part 100 may be allowed, whereas relative movement between the second nozzle members 220 in another direction (e.g., a direction intersecting the longitudinal direction of the barrel part) may be inhibited.

For reference, the adjacent first nozzle members 210 are fixed to each other by the coupling members 219. Therefore, when any one of the adjacent barrel parts 100 is expanded, the second nozzle member 220 disposed on the expanded barrel part 100 may rectilinearly move away from the first nozzle member 210. In contrast, when any one of the adjacent barrel parts 100 is contracted, the second nozzle member 220 disposed on the contracted barrel part 100 may rectilinearly move toward the first nozzle member 210.

In the embodiment of the present disclosure illustrated and described above, the example has been described in which the adjacent second nozzle members are connected to each other by the guide groove and the guide protrusion. However, according to another embodiment of the present disclosure, the adjacent second nozzle members may be connected to each other by the coupling hole and the coupling member.

In addition, referring to FIGS. 10 and 15 to 18, according to the exemplary embodiment of the present disclosure, the pressure vessels 10 may include a connection member 230 configured to integrally connect the adjacent first nozzle members 210.

In this case, the adjacent first nozzle members 210 may be defined as a concept including both the first nozzle members 210 disposed adjacent to one another in the upward/downward direction (e.g., based on FIG. 15) and the first nozzle members 210 disposed adjacent to one another in the leftward/rightward direction (e.g., based on FIG. 15).

Since the plurality of first nozzle members 210 are connected to one another by the connection member 230 as described above, it is possible to obtain an advantageous effect of more stably maintaining the disposition and arrangement states of the plurality of pressure vessels 10 and improving safety and reliability.

The connection member 230 may have various structures capable of integrally connecting the plurality of first nozzle members 210. The present disclosure is not restricted or limited by the structure of the connection member 230.

For example, the connection member 230 may be provided in the form of a straight plate having a length (L* the number of pressure vessels 10) corresponding to the plurality of pressure vessels 10. The plurality of first nozzle members 210 and the connection member 230 may be fastened by typical fastening members such as bolts or pins. According to another embodiment of the present disclosure, the connection member may have a bent structure having a 'C' shape or an 'S' shape.

In the embodiment of the present disclosure illustrated and described above, the example has been described in which the connection member connects the plurality of first nozzle members. However, according to another embodiment of the present disclosure, the connection member may be used to connect the plurality of second nozzle members.

Referring back to FIGS. 15 and 17, according to the exemplary embodiment of the present disclosure, the pressure vessel 10 may include: a spacer 240 interposed between the adjacent first nozzle members 210 and between the second nozzle members 220; and an intermediate clamp ring 300' disposed between the adjacent barrel parts 100 and configured to partially surround the adjacent first nozzle members 210, the spacer 240, and the adjacent second nozzle members 220.

Figure 17:
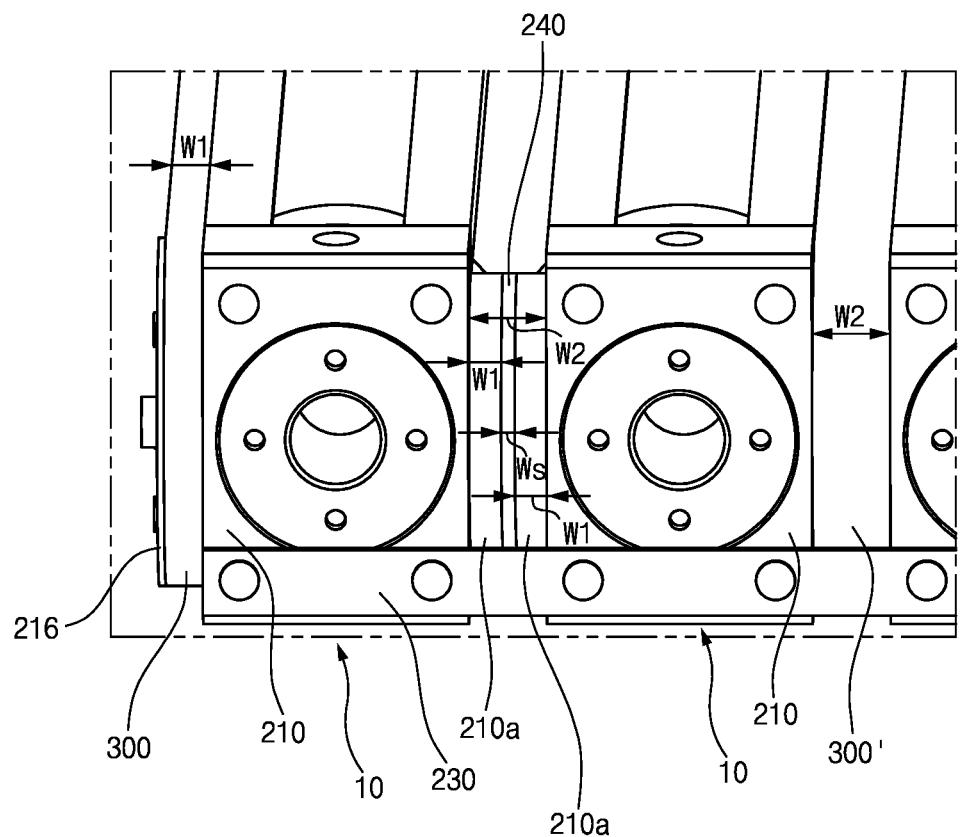
FIG. 17 is a view for explaining an intermediate clamp ring of the pressure vessel according to the embodiment of the present disclosure.

As illustrated in FIGS. 15 and 17, when the plurality of pressure vessels 10 is arranged in a horizontal direction, the first and second side plates 216 and 226 may be excluded (removed) from a portion between the adjacent first nozzle members 210 and a portion between the adjacent second nozzle members 220, and the intermediate clamp ring 300' may be seated on the adjacent first nozzle members 210, the spacer 240, and the adjacent second nozzle members 220.

Since the spacer 240 is provided between the adjacent pressure vessels 10 (e.g., between the adjacent first nozzle members) as described above, a predetermined space may be ensured between the adjacent pressure vessels 10, which makes it possible to allow the adjacent barrel parts 100 to be expanded in a diameter direction.

In addition, in the embodiment of the present disclosure, the clamp rings 300 are not respectively provided on the different pressure vessels 10, but the single intermediate clamp ring 300' may be used in common as the clamp rings 300 for the different pressure vessels 10. Therefore, it is possible to obtain an advantageous effect of simplifying the structure.

For example, the spacer 240 may have a semicircular shape corresponding to the first and second seating portions 210a and 220a. The spacer 240 may have a through-hole 242 configured to be penetrated by the coupling member 219.

In particular, a width W2 of the intermediate clamp ring 300' may be determined as a value (W2=W1+Ws+W1) made by summing up a width W1 of one of the adjacent first seating portions 210a, a width Ws of the spacer 240, and a width W1 of other of the adjacent first seating portions 210a. According to another embodiment of the present disclosure, the width of the intermediate clamp ring may be determined as a value smaller than the value made by summing up the width of one of the adjacent first seating portions, the width of the spacer, and the width of other of the adjacent first seating portions.

In addition, referring to FIGS. 1 and 3, according to the exemplary embodiment of the present disclosure, the pressure vessel 10 may include reinforcing members 260 disposed between the barrel part 100 and the clamp rings 300. The reinforcing member 260 may have an accommodation groove 260a that accommodates the clamp ring 300.

Since the reinforcing members 260 are disposed between the barrel part 100 and the clamp rings 300 as described above, it is possible to obtain an advantageous effect of inhibiting the damage to and deformation of the barrel part 100 caused by the contact between the barrel part 100 and the clamp rings 300 and effectively protecting the barrel part 100 from external impact or the like.

The reinforcing member 260 may have various structures capable of being interposed between the barrel part 100 and the clamp ring 300. The present disclosure is not restricted or limited by the structure and shape of the reinforcing member 260.

In particular, the reinforcing member 260 may be in close contact with the outer peripheral surface of the barrel part 100 so as to have a cross-section with an approximately waveform shape. The accommodation grooves 260a may be provided adjacent to corner portions 20 (see FIG. 2) of the square area. Therefore, the clamp rings 300 may be positioned in the square area 20 in the state in which the clamp rings 300 are accommodated in the accommodation grooves 260a.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A pressure vessel comprising:
a plurality of barrel parts, each disposed in a respective predefined square area of a plurality of square areas and having a diameter corresponding to a length of one side of the square area;
wherein, for each barrel part of the plurality of barrel parts, the pressure vessel further comprises:
a first nozzle member disposed at one end of the barrel part;
a second nozzle member disposed at an opposite end of the barrel part; and
clamp rings disposed in the square area, positioned outside the barrel part, and configured to lock the first and second nozzle members to the barrel part;
wherein the plurality of square areas are disposed to one another to define a matrix;
wherein the first nozzle members of barrel parts disposed in neighboring square areas are adjacent to one another and the second nozzle members of barrel parts disposed in the neighboring square areas are adjacent to one another, and
wherein the pressure vessel additionally comprises:
a guide protrusion provided on any one of the adjacent second nozzle members; and
a guide groove provided in other of the adjacent second nozzle members and configured to accommodate the guide protrusion so that the guide protrusion is slidable in a longitudinal direction of the barrel part.

2. The pressure vessel of claim 1, wherein each of the clamp rings comprises:
a first side clamp part supported on the first nozzle member;
a second side clamp part supported on the second nozzle member; and
a connection clamp part configured to continuously connect the first and second side clamp parts.

3. The pressure vessel of claim 2, further comprising:
first seating portions protruding from lateral surfaces of the first nozzle member and configured to allow the first side clamp parts to be seated thereon; and
second seating portions protruding from lateral surfaces of the second nozzle member and configured to allow the second side clamp parts to be seated thereon.

4. The pressure vessel of claim 3, wherein the first and second seating portions each have a semicircular shape, the first side clamp part is in close contact with the first seating portion, and the second side clamp part is in close contact with the second seating portion.

5. The pressure vessel of claim 3, further comprising:
first side plates coupled to the first seating portions and configured to cover lateral sides of the first side clamp parts; and
second side plates coupled to the second seating portions and configured to cover lateral sides of the second side clamp parts.

6. The pressure vessel of claim 1, wherein the square areas are arranged to define a one-dimensional matrix or a two-dimensional matrix.

7. The pressure vessel of claim 1, further comprising:
coupling holes respectively provided in the adjacent first nozzle members; and a coupling member having one end coupled to any one of the adjacent first nozzle members and an opposite end coupled to one other of the adjacent first nozzle members.

8. The pressure vessel of claim 1,
wherein the pressure vessel further comprises a connection member configured to integrally connect the adjacent first nozzle members.

9. The pressure vessel of claim 1, further comprising:
a sealing part configured to seal a gap between the barrel part and at least one of the first or second nozzle members.

10. The pressure vessel of claim 9, wherein the sealing part comprises:
a first sealing member configured to seal the gap; and
a second sealing member disposed adjacent to the first sealing member and configured to seal the gap.

11. The pressure vessel of claim 1, wherein at least one of the clamp rings is made of at least one of reinforcing fiber, thermosetting resin, or thermoplastic resin.

12. The pressure vessel of claim 1, wherein at least one of the clamp rings is provided by winding reinforcing fiber to partially surround the first and second nozzle members in a state in which the first and second nozzle members are coupled to two opposite ends of the barrel part.

13. The pressure vessel of claim 1, wherein at least one of the clamp rings is assembled to partially surround the first and second nozzle members in a state in which the first and second nozzle members are coupled to two opposite ends of the barrel part.

14. The pressure vessel of claim 1, wherein the diameter of the barrel part is determined as a value between a maximum diameter when the barrel part is maximally expanded immediately before the barrel part bursts and a minimum diameter when the barrel part is in a non-expanded state.

15. The pressure vessel of claim 1, wherein the barrel part comprises:
a liner having a storage space therein; and
a reinforcing layer configured to surround an outer peripheral surface of the liner, and
wherein the reinforcing layer is made of at least one of reinforcing fiber, thermosetting resin, or thermoplastic resin.

16. The pressure vessel of claim 1, further comprising:
at least one reinforcing member disposed between an outer circumferential surface of barrel part and the clamp rings,
wherein the at least one reinforcing member has an accommodation groove that accommodates at least one of the clamp rings.

17. A pressure vessel comprising:
a plurality of barrel parts, each disposed in a predefined square area and having a diameter corresponding to a length of on side of the square area;
wherein, for each barrel part of the plurality of barrel parts, the pressure vessel further comprises:
a first nozzle member disposed at one end of the barrel part;
a second nozzle member disposed an opposite end of the barrel part; and
clamp rings disposed in the square area, position outside the barrel part, and
configured to lock the first and second nozzle members to the barrel part;
wherein the plurality of square areas are adjacent to one another and the second nozzle members of barrel parts disposed in the neighboring square areas are adjacent to one another;
wherein the pressure vessel further comprises:
a first spacer interposed between the adjacent first nozzle members,
a second spacer interposed between the adjacent second nozzle members; and
an intermediate clamp ring disposed between the adjacent barrel parts in a longitudinal direction of the barrel part and configured to partially surround the adjacent first nozzle members, the first spacer, the second spacer, and the adjacent second nozzle members.

18. A pressure vessel comprising:
a plurality of barrel parts, each disposed in a respective predefined square area of a plurality of square areas and having a diameter corresponding to a length of one side of the square area;
wherein, for each barrel part of the plurality of barrel parts, the pressure vessel further comprises:
a first nozzle member disposed at one end of the barrel part;
a second nozzle member disposed at an opposite end of the barrel part; and
clamp rings disposed in the square area, positioned outside the barrel part,
and configured to lock the first and second nozzle members to the barrel part:
wherein at least one of the first or second nozzle members comprises:
a nozzle body; and
a nozzle cover configured to be movable in a longitudinal direction of the barrel part relative to the nozzle body,
wherein the clamp rings are supported on the nozzle cover, and
wherein a gap is defined between the nozzle body and the nozzle cover in the longitudinal direction of the barrel part, the gap is selectively adjusted based on the movement of the nozzle cover relative to the nozzle body, and
wherein the pressure vessel additionally comprises:
a guide protrusion provided on any one of the adjacent second nozzle members; and
a guide groove provided in an other of the adjacent second nozzle members and configured to accommodate the guide protrusion so that the guide protrusion is slidable in a longitudinal direction of the barrel part.

* * * * *